United States Patent
Trachewsky et al.

(10) Patent No.: US 7,181,187 B2
(45) Date of Patent: Feb. 20, 2007

(54) RF TRANSMITTER HAVING IMPROVED OUT OF BAND ATTENUATION

(75) Inventors: Jason A. Trachewsky, Menlo Park, CA (US); Alan Corry, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 367 days.

(21) Appl. No.: 10/757,931

(22) Filed: Jan. 15, 2004

(65) Prior Publication Data

US 2005/0159114 A1   Jul. 21, 2005

(51) Int. Cl.
*H04B 1/26* (2006.01)

(52) U.S. Cl. ............... 455/326; 455/113; 455/213; 375/298

(58) Field of Classification Search ............ 455/91, 455/113, 324, 108, 110, 323, 205, 212, 213; 375/260, 261, 265, 281, 293, 295, 298, 302, 375/303, 308

See application file for complete search history.

(56) References Cited

U.S. PATENT DOCUMENTS

| | | | |
|---|---|---|---|
| 6,973,141 B1* | 12/2005 | Isaksen et al. | 375/308 |
| 2002/0045426 A1* | 4/2002 | Ogi et al. | 455/78 |
| 2003/0055627 A1* | 3/2003 | Balan et al. | 704/200.1 |
| 2003/0198299 A1* | 10/2003 | Redfern | 375/260 |
| 2004/0086028 A1* | 5/2004 | Kluge et al. | 375/146 |

* cited by examiner

*Primary Examiner*—Edward F. Urban
*Assistant Examiner*—Nhan T. Le
(74) *Attorney, Agent, or Firm*—Garlick Harrison & Markison; Timothy W. Markison (57) ABSTRACT

A radio frequency transmitter includes a digital baseband and coding module, an inverse fast Fourier transform (IFFT) module, a complex digital filter, a complex digital-to-analog converter and a radio frequency modulation module. The digital baseband and coding module is operably coupled to convert outbound data into outbound symbols in accordance with a baseband encoding protocol. The IFFT module is operably coupled to convert the outbound symbols into a complex time domain sample sequence. The complex digital filter is operably coupled to filter the complex time domain sequence such that signal strength of outbound RF signals in an exclusion RF band is at or below a specified signal strength with negligible attenuation on in-band signal strength.

12 Claims, 5 Drawing Sheets

FIG. 5
bi-quad stage 120, 122, 124 stage 120: $b_{0,0} = 58$, $b_{1,0} = 58$, $b_{2,0} = -2$, $a_{1,0} = -46$, $a_{2,0} = 3$
stage 122: $b_{0,1} = 34$, $b_{1,1} = -12$, $b_{2,1} = 40$, $a_{1,1} = -44$, $a_{2,0} = 19$
stage 124: $b_{0,2} = 30$, $b_{1,2} = -33$, $b_{2,2} = 33$, $a_{1,2} = -42$, $a_{2,0} = 28$

FIG. 6

RF TRANSMITTER HAVING IMPROVED OUT OF BAND ATTENUATION

BACKGROUND OF THE INVENTION

1. Technical Field of the Invention

This invention relates generally to wireless communication systems and, more particularly, to radio frequency transmitters used within such systems.

2. Description of the Related Art

As is known, use of frequencies for wireless communications is partitioned into frequency bands by government agencies. For instance, the Federal Communications Commission (FCC) defines, for the United States, frequency bands for specific uses and for which an FCC license is required (e.g., radio transmissions, television transmissions, etc.) and also defines frequency bands that are unlicensed and, as such, can be used for a variety of applications. For instance, the FCC has defined several frequency bands in the radio frequency spectrum as being unlicensed. Such unlicensed frequency bands include 902–928 MHz, 2.4–2.483 GHz and 5.75–5.85 GHz, which are collectively referred to as the ISM (Industrial Scientific Medical) band. Currently, the ISM band is used for in-building and system applications (e.g., bar code readers), industrial microwave ovens, wireless patient monitors, and wireless local area networks (WLAN).

As is also known, there are standard bodies that define standards for WLAN equipment within the ISM band. Such standards include, but are not limited to, Bluetooth, IEEE 802.11(a), IEEE 802.11(b), and IEEE 802.11(g). The IEEE 802.11(g) standard provides wireless LAN operation specifications in the 2.4–2.482 GHz band. Specification applies to both transmitters and receivers and defines data rates, modulation schemes, transmitter architectures, receiver architectures, etc. In general, the specified modulation schemes are based on Orthogonal Frequency Division Multiplexing (OFDM) which, for 802.11(g) divides the 2.4–2.482 GHz band into a plurality of channels. Further, as specified, the channels at the boundaries of the frequency band (e.g., channels 1 and 11 that are centered at 2.412 GHz and 2.462 GHz, respectively) are preferred channels of use.

As is further known, the FCC has defined exclusion frequency bands around the 2.4–2.482 GHz frequency band. One exclusion frequency band begins at 2.390 GHz and includes lower frequencies and the other exclusion frequency band begins at 2.4835 GHz and includes higher frequencies. An issue arises when fabricating a transmitter in accordance with the architecture defined within the 802.11 (g) specification, in that, for channels 1 and 11, the transmit power levels in the exclusion frequency bands are too great, which violates the FCC restrictions on use of the exclusion frequency bands.

Therefore, a need exists for a transmitter that provides desired power levels within prescribed frequency bands of operation and does not violate transmit power levels in non-prescribed frequency bands.

BRIEF SUMMARY OF THE INVENTION

The RF transmitter having out-of-band attenuation of the present invention substantially meets these needs and others. In one embodiment, a radio frequency transmitter includes a digital baseband and coding module, an inverse fast Fourier transform (IFFT) module, a complex digital filter, a complex digital-to-analog converter and a radio frequency modulation module. The digital baseband and coding module is operably coupled to convert outbound data into outbound symbols in accordance with a baseband encoding protocol (e.g., binary phase shift keying (BPSK), orthogonal frequency division multiplexing (OFDM), quadrature phase shift keying (QPSK), 16 quadrature amplitude modulation (QAM) OFDM, and/or 64 QAM OFDM). The inverse fast Fourier transform module is operably coupled to convert the outbound symbols into a complex time domain sample sequence. The complex digital filter is operably coupled to filter the complex time domain sequence to produce a filtered complex time domain sample sequence. The complex digital-to-analog converter is operably coupled to convert the filtered complex time domain sample sequence into in-phase analog signal components and quadrature analog signal components. The radio frequency modulation module is operably coupled to convert the in-phase and quadrature analog signal components into outbound radio frequency signals. As configured, the complex digital filter attenuates the complex time domain sample sequence such that signal strength of the outbound radio frequency signals in an exclusion radio frequency band is at or below a specified signal strength with negligible attenuation on in-band signal strength.

In another embodiment, a radio frequency transmitter includes a digital baseband encoding module, a digital filter, an inverse fast Fourier transform module, a complex digital-to-analog converter, and a radio frequency modulation module. The digital baseband and coding module is operably coupled to convert outbound data into outbound symbols in accordance with a baseband encoding protocol. The digital filter is operably coupled to filter the outbound symbols to produce filtered outbound symbols. The inverse fast Fourier transform module is operably coupled to convert the filtered outbound symbols into a complex time domain sample sequence. The complex digital-to-analog converter is operably coupled to convert the complex time domain sample sequence into in-phase analog signal components and quadrature analog signal components. The radio frequency modulation module is operably coupled to convert the in-phase and quadrature analog signal components into outbound radio frequency signals. The complex digital filter is operably to attenuate the complex time domain sample sequence such that signal strength of the outbound radio frequency signals in an exclusion radio frequency band is at or below a specified signal strength while having negligible attenuation on the signal strength within a desired frequency band.

DETAILED DESCRIPTION OF THE INVENTION

Figure 1:
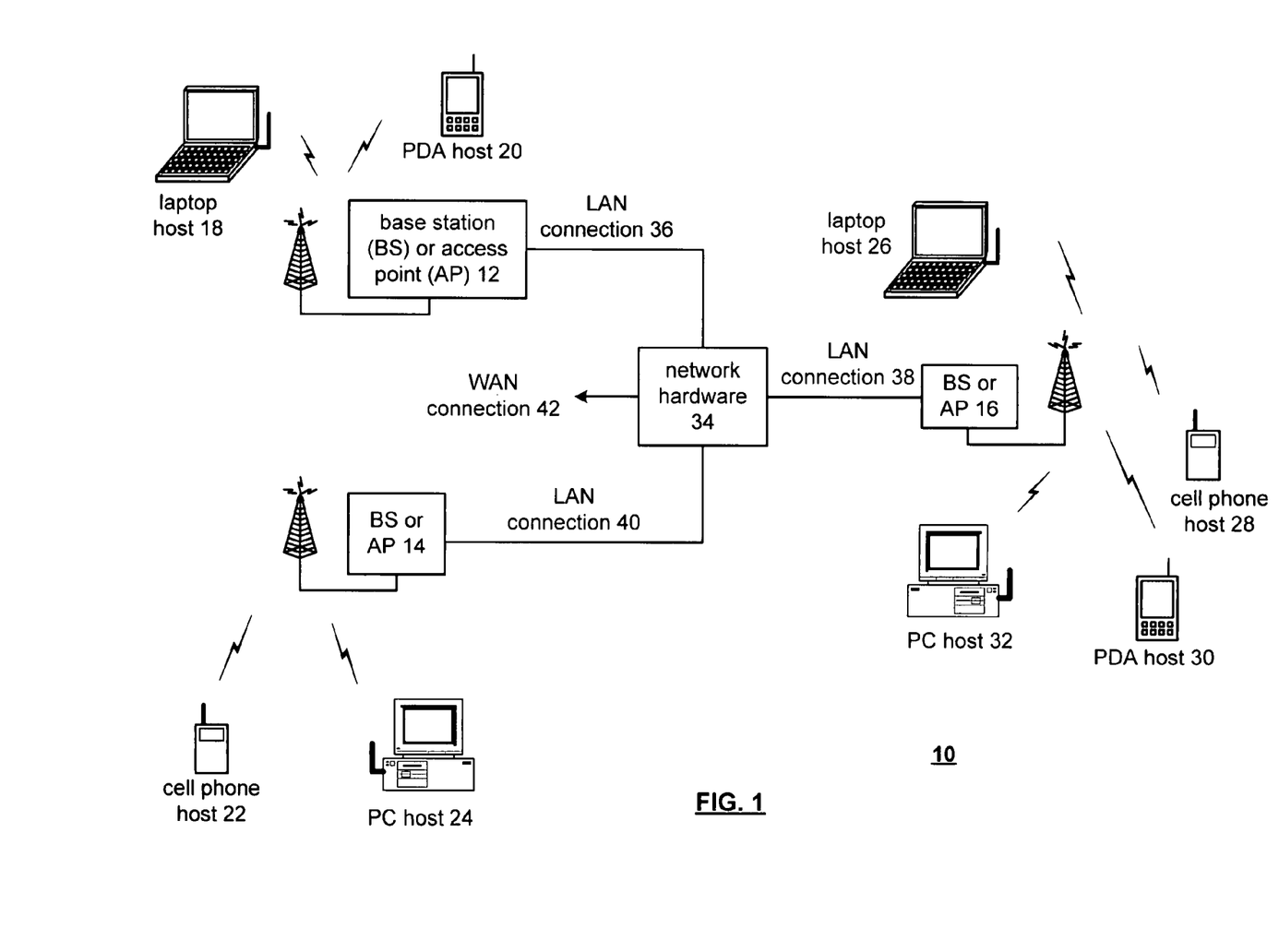
FIG. 1 is a schematic block diagram of a wireless communication system in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
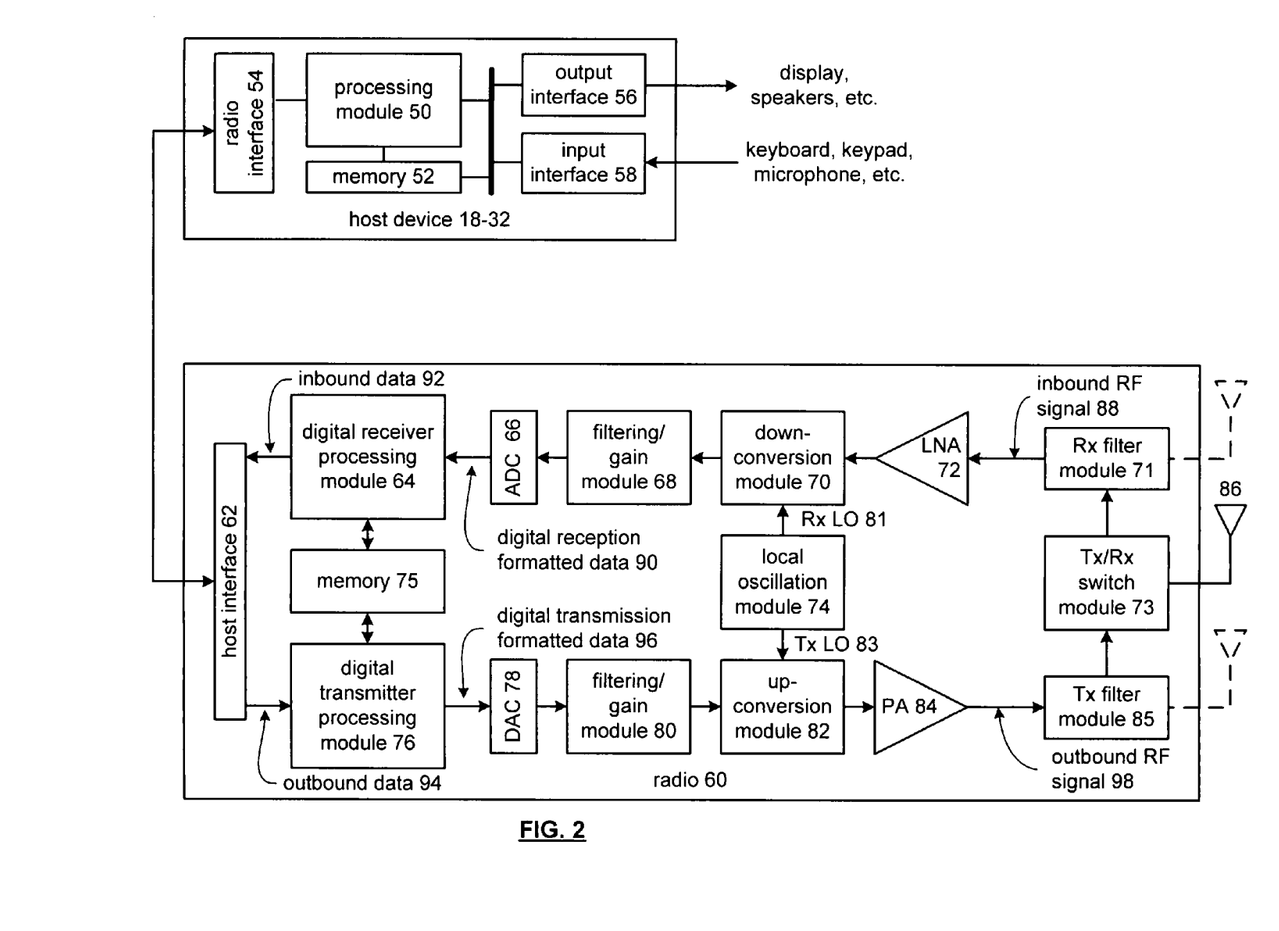
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. Note that the filter/gain module 80, the up-conversion module 82, the power amplifier 84, and the transmit filter module 85 comprises an RF modulation module of the radio. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figures 3, 4:
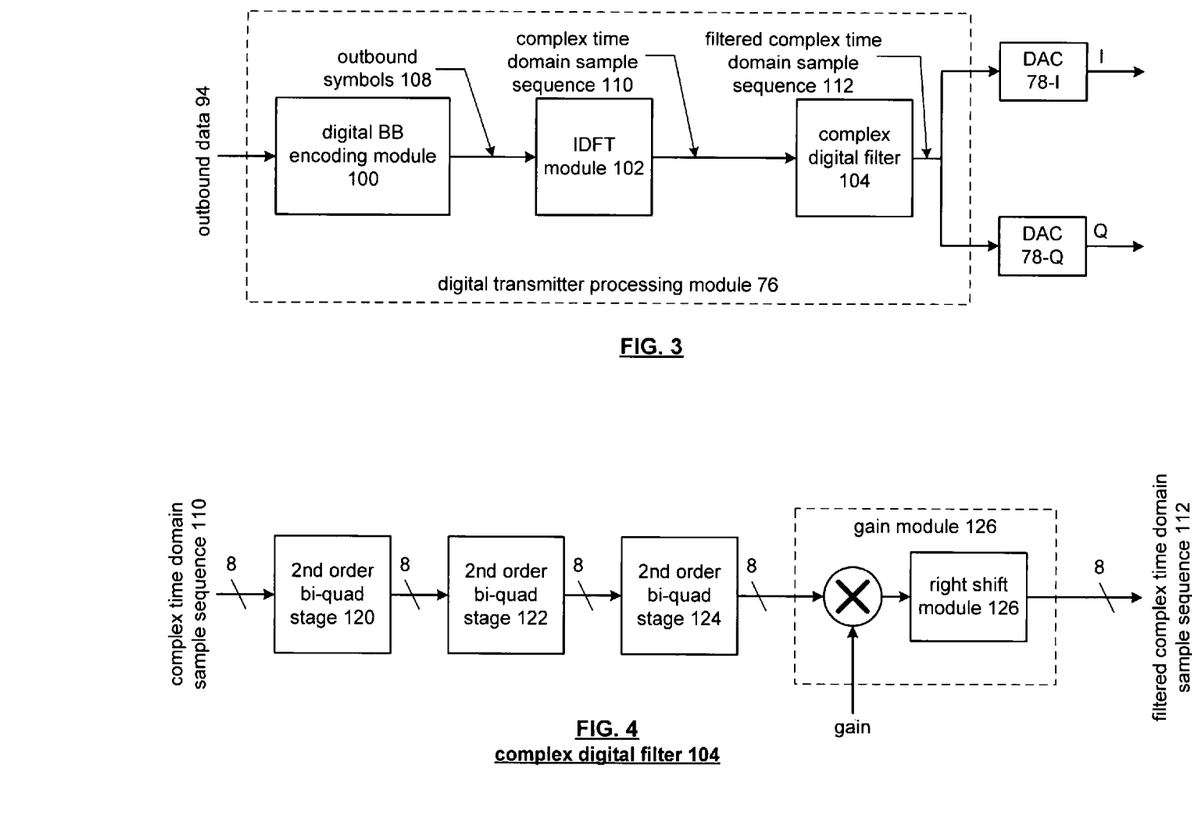
FIG. 3 is a schematic block diagram of a transmitter in accordance with the present invention.
FIG. 4 is a schematic block diagram of a complex digital filter in accordance with the present invention.

FIG. 3 is a schematic block diagram of the digital transmitter processing module 76 and the digital-to-analog converter 78. In this embodiment, the digital transmitter processing module 76 includes a digital baseband encoding module 100, an Inverse Fast and/or discrete Fourier Transform (IFFT and/or IDFT) module 102 and a complex digital filter 104. The digital-to-analog converter 78 is a complex digital-to-analog converter and includes an in-phase digital-to-analog converter 78-I and a quadrature digital-to-analog converter 78-Q. The digital baseband encoding module performs a baseband encoding protocol, such as BPSK OFDM, QPSK OFDM, 16 QAM OFDM, and/or 64 QAM ORPM. In particular, the digital baseband encoding module 100 may include a forward error correction coder and an interleaving atid mapping module to produce outbound symbols 108.

The IFFT and/or IDFT module 102 converts the outbound symbols 108 into complex time domain sample sequence 110. The functionality of an inverse fast Fourier transform is known, thus, no further discussion will be presented except to further illustrate the concepts of the present invention. The complex digital filter 104, which may be a low pass filter and/or bandpass filter and will be described in greater detail with reference to FIGS. 4 and 5, filters the complex time domain sample sequence 110 to produce filtered complex time domain sample sequence 112. In general, the complex digital filter 104 is a low pass filter to provide further attenuation of frequencies outside the bands of interest (i.e., filters undesired channels and passes the desired channel). For instance, the complex digital filter 104 provides a faster roll-off of the channels at the boundaries of the frequency spectrum such that when the in-phase and quadrature components are convened into radio frequency signals, the out-of-band signal strength is at or below the required signal strength of the exclusion bands for non-prescribed transmissions.

The complex digital-to-analog converters 78-I and 78-Q convert the filtered complex time domain sample sequence 112 into in-phase analog signal components (I) and quadrature analog signal components (Q).

FIG. 4 illustrates a schematic block diagram of the complex digital filter 104, which may be implemented as a multi-order elliptical low pass filter. The complex digital filter 104 includes three second-order bi-quad stages 120, 122, and 124 and a gain module 126. The gain module 126 includes a multiplier 127 and a right-shift module 128 to produce the filtered complex time domain sample sequence 112. In operation, the first second-order bi-quad stage 120 receives, in 8-bit words, the complex time domain sample sequence 110 and filters it to produce an 8-bit filtered sample. The 8-bit filtered sample is passed to the second stage 122 and the third stage 124, which further filters the signal to produce a multi-stage filtered 8-bit sample. The gain module 126 multiplies the 8-bit multi-ordered filtered 8-bit sample with a gain value, which is then subsequently right-shifted to produce the desired gain level for the filtered complex time domain sample sequence 112. As one of average skill in the art will appreciate, other embodiments may be used to produce the complex digital filter 104. For instance, a multi-order Chebychev low pass filter.

Figure 5:
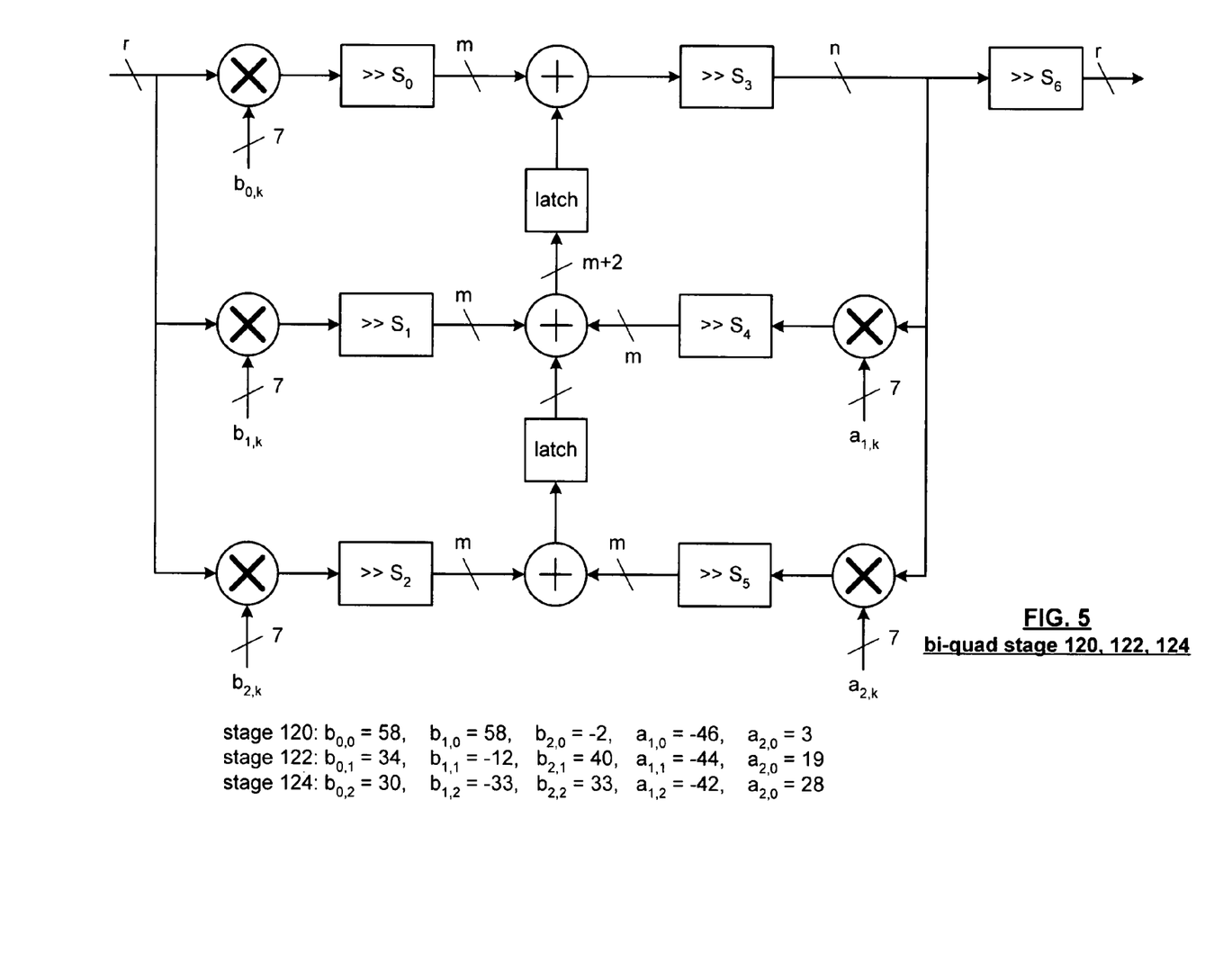
FIG. 5 is a schematic block diagram of a bi-quad stage of the complex digital filter in accordance with the present invention.

FIG. 5 is schematic block diagram of one of the bi-quad stages 120, 122, or 124. As shown, the bi-quad stage includes a plurality of multipliers, a plurality of right-shift modules ($>>S_n$), adders, and latches. The coefficients for each stage includes $B_0,k$, $B_1,k$, $B_2,k$, $A_1,k$, and $A_2,k$. FIG. 5 also illustrates the particular coefficient values for one embodiment of the filter.

Figure 6:
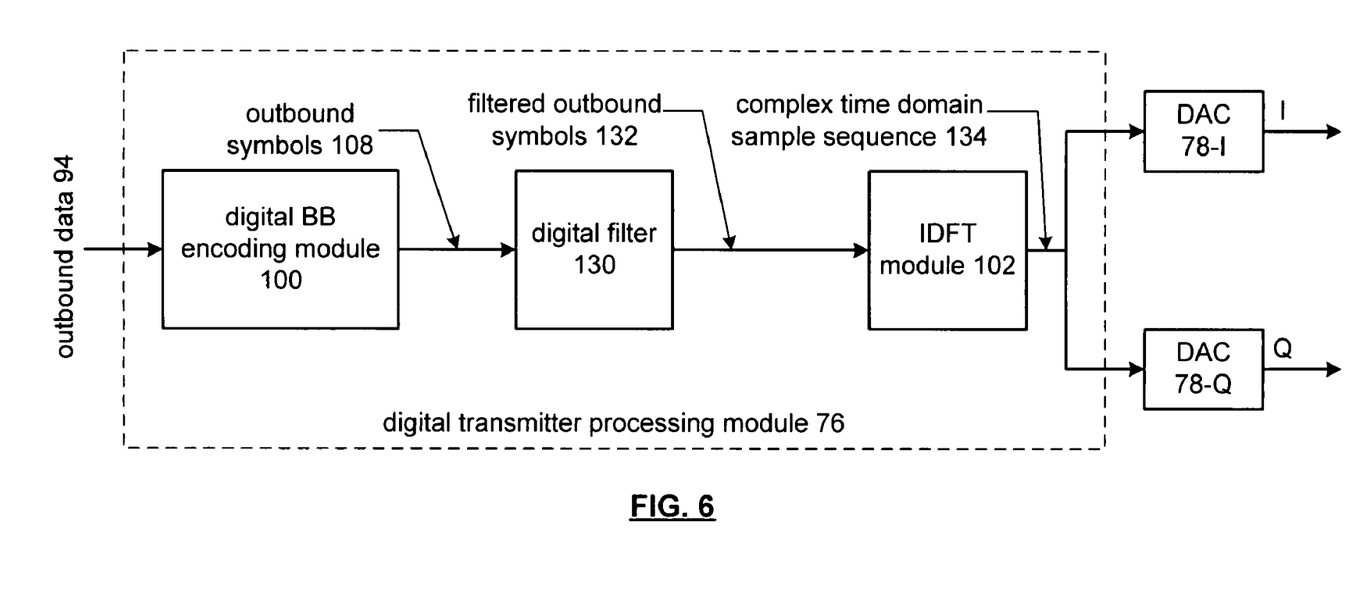
FIG. 6 is a schematic block diagram of an alternate transmitter in accordance with the present invention.

FIG. 6 is a schematic block diagram of an alternate embodiment of the digital transmit processing module 76 coupled to the complex digital-to-analog converters 78-I and 78-Q. In this embodiment, the digital transmit processing module 76 includes the digital baseband encoding module 100, a digital filter 130 and the inverse fast and/or discrete Fourier transform module 102. In this embodiment, the digital baseband encoding module 100 converts outbound data 94 into outbound symbols 108 in accordance with a baseband encoding protocol prescribed by a particular standard (e.g., IEEE 802.11(g)).

The digital filter 130, which may be a frequency domain window based IFFT shaping form, filters the outbound symbols 108 to produce filtered outbound symbols 132. The frequency response of the digital filter 130 is such that when the filtered outbound symbols 132 are converted to radio frequency signals, the signal strength in the exclusion frequency bands are at or below the specified levels for non-licensed transmissions.

The IFFT and/or IDFT module 102 converts the filtered outbound symbols 130 into complex time domain sample sequence 134. The complex digital-to-analog converters 78-I and 78-Q convert the complex time domain sample sequence 134 into in-phase analog signal components (I) and quadrature analog signal components (Q).

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a radio frequency transmitter that includes out-of-band attenuation. By including a digital filter within the digital transmit processing module, additional attenuation is achieved at RF for out-of-band frequencies while having negligible effect on signal strength of RF signals within the desired frequency bands. As one of average skill in the art will appreciate, other embodiments may be derived from the teaching of the present invention without deviating from the scope of the claims.

What is claimed is:

1. A radio frequency transmitter comprises:
   digital baseband encoding module operably coupled to convert outbound data into outbound symbols in accordance with a baseband encoding protocol;
   inverse discrete Fourier transform (IDFT) module operably coupled to convert the outbound symbols into a complex time domain sample sequence;
   complex digital filter operably coupled to filter the complex time domain sample sequence to produce a filtered complex time domain sample sequence;
   complex digital to analog converter operably coupled to convert the filtered complex time domain sample sequence into in-phase analog signal components and quadrature analog signal components; and
   radio frequency modulation module operably coupled to convert the in-phase and quadrature analog signal components into outbound radio frequency signals, wherein at least one channel at a boundary of a frequency band contains the outbound radio frequency signals, wherein the complex digital filter attenuates the complex time domain sample sequence such that signal strength of the outbound radio frequency signals in an exclusion radio frequency band is at or below a specified signal strength, and wherein the frequency band is adjacent to the exclusion radio frequency band.

2. The radio frequency transmitter of claim 1, wherein the complex digital filter comprises at least one of:
   a low pass filter; and
   a bandpass filter.

3. The radio frequency transmitter of claim 2, wherein the low pass filter comprises at least one of:
   a multiple order elliptic low pass filter; and
   a multiple order Chebychev low pass filter.

4. The radio frequency transmitter of claim 2, wherein the low pass filter comprises:
   a first $2^{nd}$ order bi-quad stage;
   a second $2^{nd}$ order bi-quad stage;
   a third $2^{nd}$ order bi-quad stage operably coupled in a cascade manner to the first and second $2^{nd}$ order bi-quad stages, wherein the cascaded first, second, and third $2^{nd}$ order bi-quad stages filter the complex time domain sample sequence to produce a multiple order filtered sample sequence; and
   a gain module operably coupled to amplify the multiple order filtered sample sequence to produce the filtered complex time domain sample sequence.

5. The radio frequency transmitter of claim 1, wherein the baseband encoding protocol comprises at least one of:
   IEEE 802.11g,
   IEEE 802.11a; and
   IEEE 802.11b.

6. The radio frequency transmitter of claim 1, wherein the IDFT module comprises:
   an inverse fast Fourier transform (IFFT) module.

7. A radio frequency transmitter comprises:
   digital baseband encoding module operably coupled to convert outbound data into outbound symbols in accordance with a baseband encoding protocol;
   digital filter operably coupled to filter the outbound symbols to produce a filtered outbound symbols;
   inverse discrete Fourier transform (IDFT) module operably coupled to convert the filtered outbound symbols into a complex time domain sample sequence;
   complex digital to analog converter operably coupled to convert the complex time domain sample sequence into in-phase analog signal components and quadrature analog signal components; and
   radio frequency modulation module operably coupled to convert the in-phase and quadrature analog signal components into outbound radio frequency signals, wherein at least on channel at a boundary of a frequency band contains the outbound radio frequency signals, wherein the complex digital filter attenuates the complex time domain sample sequence such that signal strength of the outbound radio frequency signals in an exclusion radio frequency band is at or below a specified signal strength, and wherein the frequency band is adjacent to the exclusion radio frequency band.

8. The radio frequency transmitter of claim 7, wherein the digital filter comprises at least one of:
   a low pass filter; and
   a bandpass filter.

9. The radio frequency transmitter of claim 8, wherein the low pass filter comprises at least one of:
   a multiple order elliptic low pass filter; and
   a multiple order Chebychev low pass filter.

10. The radio frequency transmitter of claim 8, wherein the low pass filter comprises:
   a first $2^{nd}$ order bi-quad stage;
   a second $2^{nd}$ order bi-quad stage;
   a third $2^{nd}$ order bi-quad stage operably coupled in a cascade manner to the first and second $2^{nd}$ order bi-quad stages, wherein the cascaded first, second, and third $2^{nd}$ order bi-quad stages filter the complex time domain sample sequence to produce a multiple order filtered sample sequence; and a gain module operably coupled to amplify the multiple order filtered sample sequence to produce the filtered complex time domain sample sequence.

11. The radio frequency transmitter of claim 7, wherein the baseband encoding protocol comprises at least one of:
   IEEE 802.11g,
   IEEE 802.11a; and
   IEEE 802.11b.

12. The radio frequency transmitter of claim 7, wherein the IDFT module comprises:
   an inverse fast Fourier transform (IFFT) module.

* * * * *